(12) United States Patent
Singh

(10) Patent No.: US 11,859,626 B2
(45) Date of Patent: Jan. 2, 2024

(54) INCIPIENT COMPRESSOR SURGE DETECTION USING ARTIFICIAL INTELLIGENCE

(71) Applicant: Hamilton Sundstrand Corporation, Charlotte, NC (US)

(72) Inventor: Manupriya Singh, Uttar Pradesh (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/699,644

(22) Filed: Mar. 21, 2022

(65) Prior Publication Data
US 2023/0235743 A1    Jul. 27, 2023

(30) Foreign Application Priority Data
Jan. 24, 2022 (IN) .............................. 202211003981

(51) Int. Cl.
*F04D 27/00* (2006.01)
*G06N 3/08* (2023.01)
(Continued)

(52) U.S. Cl.
CPC ........... *F04D 27/001* (2013.01); *F04D 27/02* (2013.01); *G06N 3/08* (2013.01); *G06N 20/00* (2019.01);
(Continued)

(58) Field of Classification Search
CPC ......... F04D 27/001; F04D 27/02; G06N 3/08; G06N 20/00; F05D 2260/81;
(Continued)

(56) References Cited

U.S. PATENT DOCUMENTS

| 6,354,806 B1* | 3/2002 | Bingham, Jr. ........ F04D 27/001 |
| | | 415/118 |
| 7,027,953 B2* | 4/2006 | Klein ..................... G01H 1/006 |
| | | 702/182 |

(Continued)

FOREIGN PATENT DOCUMENTS

| CN | 108830127 A | 11/2018 |
| CN | 110006655 A | 7/2019 |

(Continued)

OTHER PUBLICATIONS

Abstract of CN108830127A, Published Nov. 16, 2018, 1 page.
(Continued)

*Primary Examiner* — Phutthiwat Wongwian
*Assistant Examiner* — Susan E Scharpf
(74) *Attorney, Agent, or Firm* — CANTOR COLBURN LLP

(57) ABSTRACT

Examples described herein provide a computer-implemented method that includes receiving training data indicative of incipient compressor surge for cabin air compressors. The method further includes generating, using the training data, a training spectrogram. The method further includes training, by a processing system, a machine learning model to detect incipient compressor surge events for the cabin air compressors using the spectrogram. The method further includes receiving, at a microcontroller associated with a cabin air compressor, operating data associated with the cabin air compressor. The method further includes generating, at the microcontroller and using the operating data, an operating spectrogram. The method further includes detecting, by the microcontroller associated with the cabin air compressor, an incipient compressor surge event by applying the machine learning model to the operating spectro-
(Continued)

gram. The method further includes implementing a corrective action to correct the incipient compressor surge event.

20 Claims, 6 Drawing Sheets

(51) Int. Cl.
*G06N 20/00* (2019.01)
*F04D 27/02* (2006.01)
(52) U.S. Cl.
CPC .... *F05D 2260/81* (2013.01); *F05D 2270/101* (2013.01); *F05D 2270/334* (2013.01); *F05D 2270/709* (2013.01)
(58) Field of Classification Search
CPC ......... F05D 2270/101; F05D 2270/334; F05D 2270/709
See application file for complete search history.

(56) References Cited

U.S. PATENT DOCUMENTS

| | | | | |
|---|---|---|---|---|
| 10,317,276 | B2* | 6/2019 | Liu | F04D 29/668 |
| 10,921,777 | B2* | 2/2021 | Rich | B23Q 17/12 |
| 2003/0105535 | A1* | 6/2003 | Rammler | G05B 19/409 700/20 |
| 2016/0103012 | A1* | 4/2016 | Liu | F01D 21/14 702/33 |
| 2020/0311559 | A1* | 10/2020 | Chattopadhyay | G06N 5/01 |
| 2020/0393385 | A1* | 12/2020 | Hillel | F04D 27/001 |
| 2020/0408106 | A1* | 12/2020 | Karnofski | F01D 23/00 |
| 2021/0026334 | A1* | 1/2021 | Mazur | G05B 19/4184 |
| 2021/0362840 | A1* | 11/2021 | Rafferty | H02P 29/024 |

FOREIGN PATENT DOCUMENTS

| | | |
|---|---|---|
| CN | 110702411 A | 1/2020 |
| CN | 112580267 A | 3/2021 |
| CN | 113537044 A | 10/2021 |
| CN | 112990542 B | 11/2021 |
| CN | 113657244 A | 11/2021 |
| KR | 20210104349 A | 8/2021 |
| WO | 2020131968 A1 | 6/2020 |

OTHER PUBLICATIONS

Abstract of CN110006655A, Published: Jul. 12, 2019, 1 page.
Abstract of CN110702411A, Published: Jan. 17, 2020, 1 page.
Abstract of CN112580267A; Published: Mar. 3, 2021, 1 page.
Abstract of CN113537044A, Published: Oct. 22, 2021, 1 page.
Abstract of CN113657244A, Published: Nov. 16, 2021, 1 page.
European Search Report for International Application 23153111.2 dated May 26, 2023.
Markiewicz Michal et al; "Predictive Maintenance of Induction Motors Using Ultra-Low Power Wireless Sensors and Compressed Recurrent Neural Networks", vol. 7, Dec. 17, 2019, pp. 178891-178902.

* cited by examiner

INCIPIENT COMPRESSOR SURGE DETECTION USING ARTIFICIAL INTELLIGENCE

CROSS-REFERENCE TO RELATED APPLICATIONS

This application claims the benefit of Indian Application Serial No. 202211003981 filed Jan. 24, 2022, the disclosure of which is incorporated herein by reference in its entirety.

BACKGROUND

The subject matter disclosed herein generally relates to aircraft and, more particularly, to incipient compressor surge detection using artificial intelligence.

Aircraft commonly includes cabin air conditioning and temperature control systems (CACTCS). A CACTCS provides pressurized air into a cabin of the aircraft to meet cabin and flight deck pressure requirements. A CACTCS can include a cabin air compressor (CAC). A CAC compresses air and provides the force necessary to move the air through the CACTCS.

BRIEF DESCRIPTION

According to one embodiment described herein, method for incipient compressor surge detection using artificial intelligence is provided. The method includes receiving, at a processing system, training data indicative of incipient compressor surge for cabin air compressors. The method further includes generating, at the processing system and using the training data, a training spectrogram. The method further includes training, by the processing system, a machine learning model to detect incipient compressor surge events for the cabin air compressors using the spectrogram. The method further includes receiving, at a microcontroller associated with a cabin air compressor, operating data associated with the cabin air compressor. The method further includes generating, at the microcontroller and using the operating data, an operating spectrogram. The method further includes detecting, by the microcontroller associated with the cabin air compressor, an incipient compressor surge event by applying the machine learning model to the operating spectrogram. The method further includes implementing a corrective action to correct the incipient compressor surge event.

In addition to one or more of the features described above, or as an alternative, the method further includes that the training data comprises first vibration data and speed data.

In addition to one or more of the features described above, or as an alternative, the method further includes that the operating data comprises second vibration data collected by a vibration sensor associated with the cabin air compressor.

In addition to one or more of the features described above, or as an alternative, the method further includes that generating the training spectrogram comprises applying a fast Fourier transform to the training data.

In addition to one or more of the features described above, or as an alternative, the method further includes that generating the operating spectrogram comprises applying a fast Fourier transform to the operating data.

In addition to one or more of the features described above, or as an alternative, the method further includes, subsequent to training the machine learning model, evaluating the machine learning model based at least in part on an accuracy of the machine learning model, a latency of the machine learning model, and a memory usage of the machine learning model.

In addition to one or more of the features described above, or as an alternative, the method further includes converting the machine learning model to a reduced machine learning model executable by the microcontroller, wherein the machine learning model is not executable by the microcontroller.

In addition to one or more of the features described above, or as an alternative, the method further includes that the converting the machine learning model to the reduced machine learning model comprises reducing a size of the machine learning model by performing post-training quantization of model weights and activations.

In addition to one or more of the features described above, or as an alternative, the method further includes that the converting the machine learning model to the reduced machine learning model comprises pruning the machine learning model to remove at least one synapse from the machine learning model.

In addition to one or more of the features described above, or as an alternative, the method further includes that the machine learning model comprises a convolutional neural network.

According to another embodiment, a cabin air conditioning and temperature control system is provided. The cabin air conditioning and temperature control system includes a cabin air compressor, a vibration sensor associated with the cabin air compressor, and a microcontroller. The microcontroller includes a memory storing a machine learning model and computer readable instructions, wherein the machine learning model is trained to detect incipient compressor surge events for the cabin air compressor. The microcontroller further includes a processing device for executing the computer readable instructions, the computer readable instructions controlling the processing device to perform operations. The operations include receiving operating data from the vibration sensor. The operations further include generating, using the operating data, an operating spectrogram. The operations further include detecting an incipient compressor surge event by applying the machine learning model to the operating spectrogram. The operations further include implementing a corrective action to correct the incipient compressor surge event.

In addition to one or more of the features described above, or as an alternative, the cabin air conditioning and temperature control system further includes that the machine learning model is trained using vibration data and speed data.

In addition to one or more of the features described above, or as an alternative, the cabin air conditioning and temperature control system further includes that the machine learning model is trained by a processing system remote from the cabin air conditioning and temperature control system.

According to another embodiment, a computer program product is provided. The computer program product includes a computer readable storage medium having program instructions embodied therewith, the program instructions executable by a processor to cause the processor to perform operations. The operations include collecting data from sensors associated with cabin air compressors. The operations further include preprocessing the data by separating the data into time slots and applying a fast Fourier transform to the data within each of the time slots to generate training spectrograms. The operations further include designing a machine learning model. The operations further include training the machine learning model using the training spectrograms. The operations further include evaluating the machine learning model. The operations further include converting the machine learning model to a reduced machine learning model. The operations further include deploying the reduced machine learning model to a microcontroller associated with a cabin air compressor.

In addition to one or more of the features described above, or as an alternative, the computer program product further includes that designing the machine learning model is based on a desired accuracy of the machine learning model, a desired latency of the machine learning model, and a desired a memory usage of the machine learning model.

In addition to one or more of the features described above, or as an alternative, the computer program product further includes that evaluating the machine learning model is performed by comparing an actual accuracy of the machine learning model, an actual latency of the machine learning model, and an actual memory usage of the machine learning model to the respective desired accuracy of the machine learning model, the desired latency of the machine learning model, and the desired a memory usage of the machine learning model.

In addition to one or more of the features described above, or as an alternative, the computer program product further includes that training the machine learning model comprises tuning model parameters to achieve the desired accuracy of the machine learning model.

In addition to one or more of the features described above, or as an alternative, the computer program product further includes that the machine learning model is a convolutional neural network trained to perform feature extraction on operating spectrograms.

In addition to one or more of the features described above, or as an alternative, the computer program product further includes that collecting data from the sensors associated with the cabin air compressors includes: performing a built-in test of the cabin air compressor, detecting a surge by the built-in test, and responsive to detecting the surge, saving the data a predetermined time interval before the detected surge.

In addition to one or more of the features described above, or as an alternative, the computer program product further includes that the data comprises vibration data and speed data.

The foregoing features and elements may be combined in various combinations without exclusivity, unless expressly indicated otherwise. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
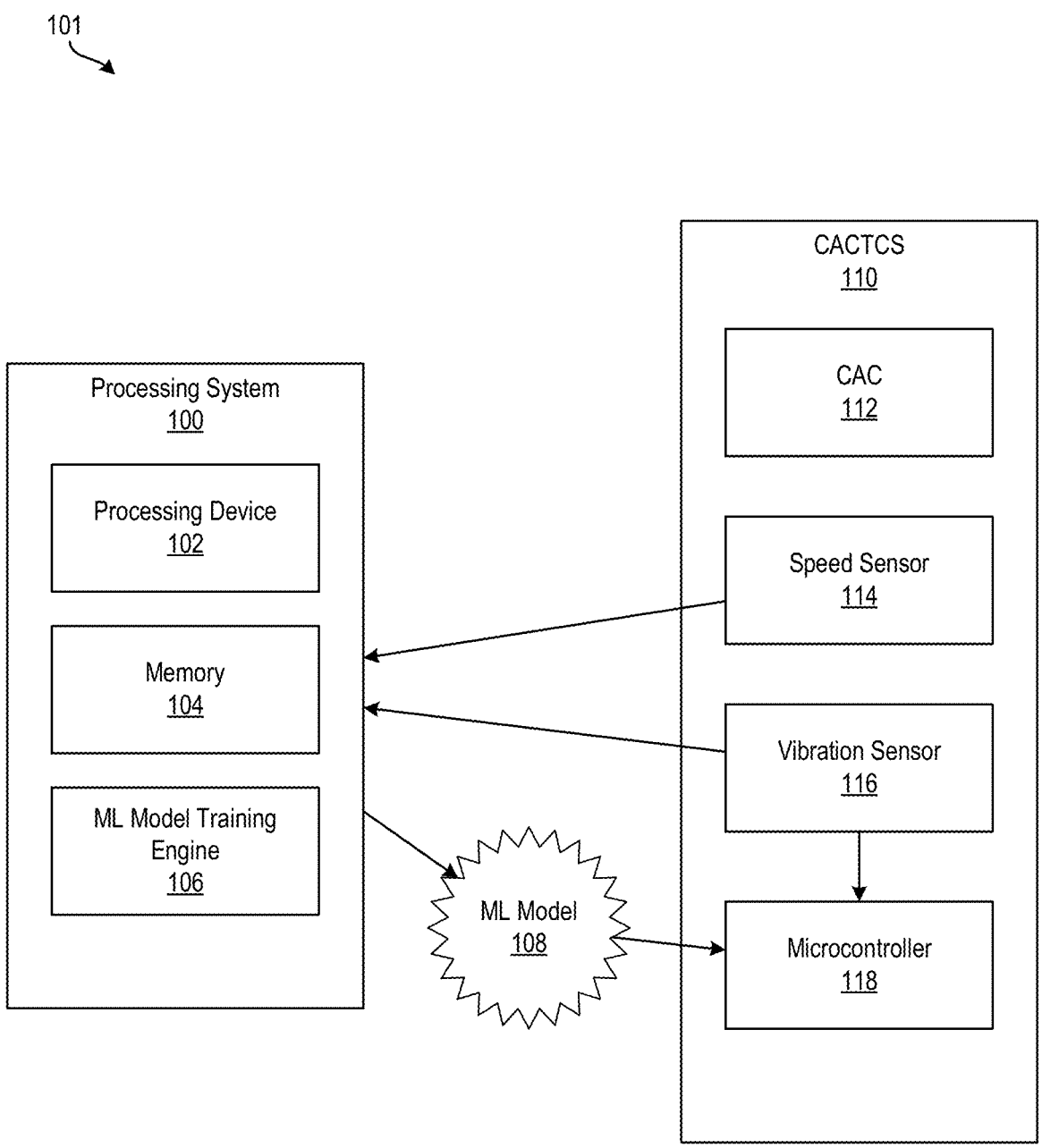
FIG. 1 depicts a block diagram of a system for incipient compressor surge detection using artificial intelligence according to one or more embodiments described herein.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

Turning to an overview of technologies that are more specifically relevant to aspects of the present disclosure, a cabin air conditioning and temperature control system (CACTCS) provides pressurized air to certain parts of an aircraft, for example, to meet cabin and flight deck pressure demands. Aircraft may use one or more CACTCSs. CACTCSs can include a cabin air compressor (CAC) or multiple CACs. A CAC compresses the air within the CACTCS and provides the force necessary to move the air through the CACTCS. According to an example, an aircraft may use two CACTCSs, each having two CACs.

CACs, which are line replaceable units (LRUs), are vulnerable to surge. Compressor surge can be damaging to the CAC and/or the entire CACTCS. Compressor surge causes unstable performance due to flow reversal, which is not acceptable to machines on which a compressor is mounted to ventilate or dense air. Another effect of compressor surge is on solid structure. For example, violent flows of compressor surge repeatedly hit blades in the compressor, which results in blade fatigue or even mechanical failure. This can also cause damage to bearings. Further, surging can also cause the compressor to overheat, potentially to the point at which a maximum allowable temperature is reached, at which point catastrophic failure of the CAC and/or CACTCS may occur.

Some CACTCSs and/or CACs include built-in tests (BIT) that checks the compressor surge and issues alerts. A BIT looks for compressor surge by identifying an event indicative of compressor surge, for example, when the output pressure of the CAC cycles by more than +/−2 PSIA (absolute pressure) 6 times within a 6 second period of time.

This happens when the flow reversal cycle starts, i.e., compressor surge is fully developed, and severe vibrations are already occurring. Because compressor surge events can cause damage, they may shorten the lifetime of the CAC, which may cause CAC removal, which is costly, time consuming, and reduces the usability of the aircraft (e.g., the aircraft cannot fly while the CAC and or CACTCS is being repaired/replaced).

In an effort to address these and other shortcomings of the prior art, one or more embodiments described herein provide for detecting incipient compressor surge (also referred to as "incipient surge"), which occurs before flow reversal develops. By detecting incipient compressor surge, CACs can be prevented from going into full compressor surge (or at least, the likelihood of compressor surge can be reduced). This protects CACs from damage, which improves aircraft reliability and usability.

Turning now to a more detailed description of the inventive teachings, one or more non-limiting embodiments of the present disclosure provide for detecting incipient compressor surge. Particularly, one or more embodiments provide for training a machine learning model that can be used to detect incipient surge in real-time (or near-real-time) and taking a corrective action when incipient surge is detected. One or more embodiments apply the trained machine learning model to vibration data collected from a vibration sensor associated with a CAC to detect incipient surge. One or more embodiments use edge-based processing technology to implement the machine learning model.

Turning now to the figures, FIG. 1 depicts a block diagram of a system 101 having a processing system 100 for training a machine learning model 108 to detect incipient compressor surge within a cabin air compressor (CAC) 112 of a cabin air conditioning and temperature control system (CACTCS) 110 according to one or more embodiments described herein.

The processing system 100 includes a processing device 102 (e.g., the processor 521 of FIG. 5), a memory 104 (e.g., the RAM 524 and/or the ROM 522 of FIG. 5), and a machine learning (ML) model training engine 106. The ML model training engine 106 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus, a system memory (e.g., memory 104) can store program instructions that when executed by the processing device 102 implement the engines described herein. Other engines can also be utilized to include other features and functionality described in other examples herein.

The processing system 100 trains the machine learning model 108 using the ML model training engine 106. According to one or more embodiments described herein, the processing system 100 receives data from one or more sensors of one or more CACTCSs, such as the CACTCS 110. For example, the processing system 100 can receive speed information about a speed of the CAC 112 from a speed sensor 114 associated with the CAC 112. Similarly, the processing system 100 can receive vibration information about a vibration of the CAC 112 from a vibration sensor 116 associated with the CAC 112. It should be appreciated that the processing system 110 can receive the training data from multiple sources (e.g., multiple CACTCS 110), from a data repository storing such data, etc.

According to one or more embodiments described herein, the vibration sensor 116 is an industrial vibration sensor that is used to detect vibration signals from the CAC 112. In an example, the vibration sensor 116 is mounted on the top foils of the CAC air journal bearings. The vibration sensor 116 may be configured to detect a wide range of frequencies.

According to one or more embodiments described herein, the speed sensor 114 may already be implemented in the CAC 112. The speed sensor 114 collects data about rotor speed of the CAC 112.

The ML model training engine 106 can use the speed information and/or vibration information as training data to train a machine learning model. In examples, once the data are obtained/received, the ML model training engine 106 preprocesses the data to generate training spectrograms, designs a model, trains the model, evaluates the model, converts/reduces the model, and deploys the model as the machine learning model 108. A spectrogram is a visual represent of the spectrum of frequencies over time. For example, a spectrogram can be used to visually represent a vibration wave form over time.

For example, vibration data from the vibration sensor 116 (e.g., mounted on top of fan foils of air journal bearings) is collected. The vibration data is captured in terms of time and amplitude. The vibration data is then converted into a spectrogram. A spectrogram works by breaking the time domain vibration data into a series of time periods and applying a fast Fourier transform (FFT) of these time periods. These series of FFTs are then overlapped on one another to visualize how both the amplitude and frequency of the vibration signal changes with time. FFTs alone may be insufficient because vibration frequency changes quickly with time in compressors and FFTs cannot capture that sufficiently. The resulting three-dimensional surface plot of FFTs can be rotated onto its side, and a color scale can be added to represent the amplitude. This results in a spectrogram, which acts as an image which can be labelled with a detected incipient surge condition. An example of a detected incipient surge condition is as follows: radial vibration signal as sub-synchronous vibration at a frequency of approximately $0.10\times$ to $0.20\times$ (10 to 20 percent of the rotor speed) and healthy frequency conditions. One or more additional categories can be included in other examples, but here only incipient surge and healthy used. These spectrograms are then trained using a machine learning model (e.g., a convolution neural network) and then the machine learning model is reduced/compressed to take less memory. That compressed model is then deployed on the microcontroller 118, which represents an edge device that can run continuous inferences to detect incipient surge in the CAC 112.

For example, the machine learning model 108, once trained and reduced, can be deployed to a microcontroller 118 associated with the CACTCS 110. The machine learning model 108 can be used to identify incipient compressor surges in the CAC 112 using operating data collected during real-time operation of the CACTCS 110/CAC 112.

The microcontroller 118 can be any suitable type of microcontroller. According to one or more embodiments described herein, although not shown in FIG. 1, the microcontroller 118 can include a processor for processing instructions, a memory for storing instructions and/or data, and an input/output (I/O) interface for receiving and transmitting data/signals. The microcontroller 118, in examples, supports implementing a machine learning model.

Further details of the system 101, including additional features and functionality of one or more components of the system 101, are now described with reference to FIGS. 2 and 3.

Figure 2:
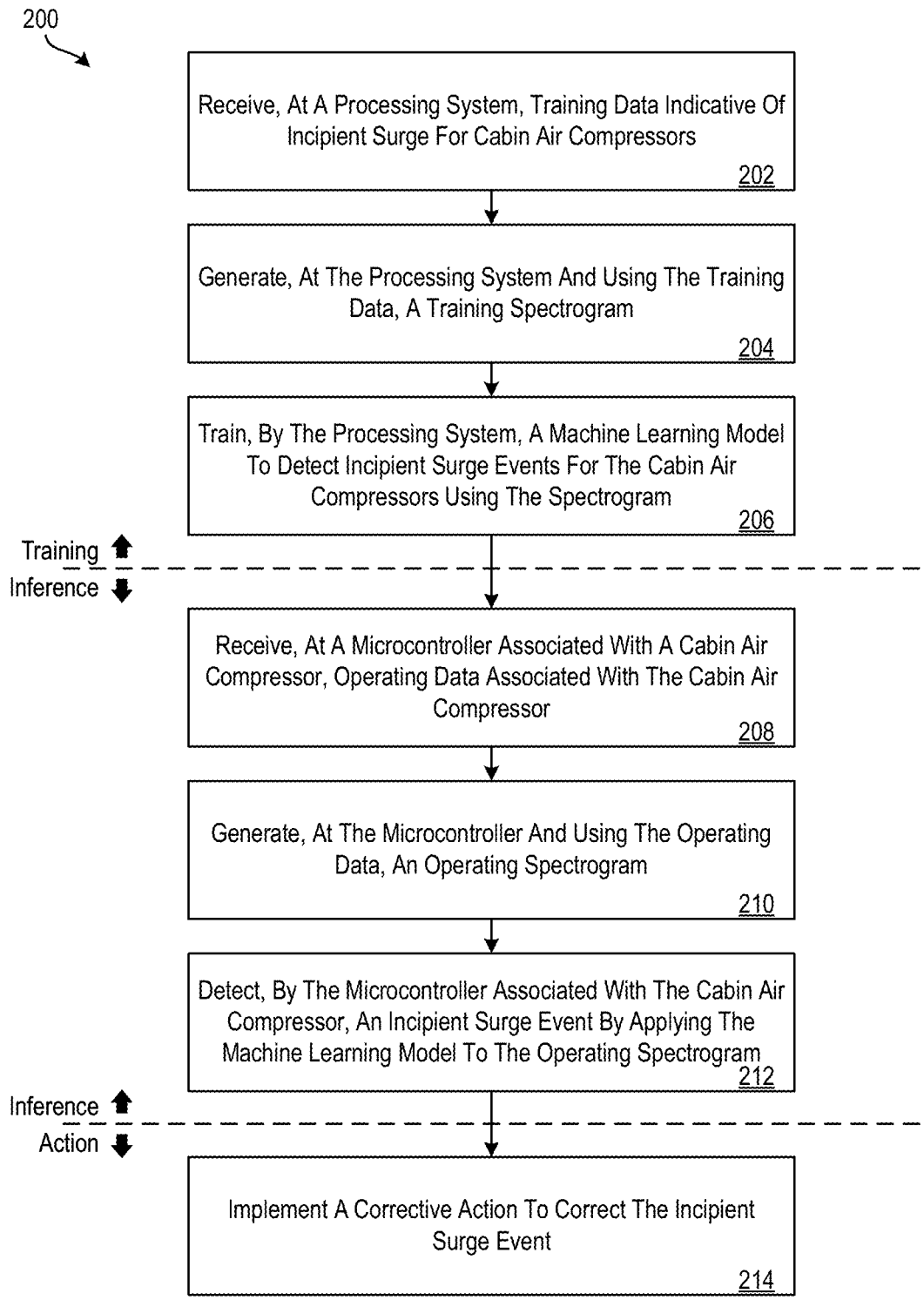
FIG. 2 depicts a flow diagram of a method for incipient compressor surge detection using artificial intelligence according to one or more embodiments described herein.

FIG. 2 depicts a flow diagram of a method 200 for training a machine learning model (e.g., the machine learning model 108) and using the machine learning model to detect incipient compressor surge within a cabin air compressor (e.g., the CAC 112) of a cabin air conditioning and temperature control system (e.g., the CACTCS 110) according to one or more embodiments described herein. The method 200 can be implemented by any suitable system or device, or combinations thereof, such as the processing system 100, the microcontroller 118, and/or the like.

The method 200 includes a training portion (blocks 202-206), an inference portion (blocks 208-212), and an action portion (block 214).

Training begins at block 202 where the processing system 100 receives training data indicative of incipient compressor surge for cabin air compressors. The training data can include speed data (e.g., speed of the rotor of the CAC 112 determined by the speed sensor 114) and vibration data (e.g., vibration signals detected by the vibration sensor 116). The training data can be received from any suitable source, such as from the sensors 114, 116, from a training repository, etc. At block 204, the processing system 100 generates, using the training data, a training spectrogram. According to one or more embodiments described herein, generating the training spectrogram includes applying a fast Fourier transform to the training data. At block 206, the processing system 100 trains a machine learning model (e.g., the machine learning model 108) to detect incipient compressor surge events for the cabin air compressors using the spectrogram. In one or more examples, the machine learning model can be a convolutional neural network trained to classify images (e.g., spectrograms).

Once training is complete, inference begins at block 208, where the microcontroller 118, which is associated with the cabin air compressor 112, receives operating data associated with the cabin air compressor. The operating data can include vibration data collected by the vibration sensor 116. At block 210, the microcontroller 118 generates, using the operating data, an operating spectrogram. The operating spectrogram differs from the training spectrogram(s) in that the operating spectrogram is based on real-time (or near-real-time) data used for inference while the training spectrogram(s) are generated using training data. According to one or more embodiments described herein, generating the operating spectrogram comprises applying a fast Fourier transform to the operating data. At block 212, the microcontroller 118 detects an incipient compressor surge event by applying the machine learning model to the operating spectrogram.

Once the inference detects an incipient surge event, a correction action can be implemented at block 214 to increase the surge margin to prevent the compressor from experiencing surge. Increasing the surge margin can be accomplished in various ways. For example, a variable diffuser can be used as a primary surge margin control; the variable diffuser position can be decreased, reducing its effective area, to increase surge margin. As another example, an anti-surge valve can be used to control surge margin by opening the valve to decrease the CAC pressure ratio while increasing CAC flow, which increases surge margin. As another example, an air cycle machine bypass valve (ABV) can be held above a minimum (or threshold) position in order to provide additional surge margin. As another example, when the variable diffuser on the CAC is failed during CAC operation, the anti-surge valve can be used to control the variable diffuser surge margin reference without an offset; in such cases, the anti-surge valve becomes the primary surge margin control.

Additional processes also may be included. According to one or more embodiments described herein, the method 200 can include evaluating the machine learning model based at least in part on an accuracy of the machine learning model, a latency of the machine learning model, and a memory usage of the machine learning model. According to one or more embodiments described herein, the method 200 can include converting the machine learning model to a reduced machine learning model executable by the microcontroller. In such cases, the machine learning model is not executable by the microcontroller. In an example, converting the machine learning model to the reduced machine learning model can include reducing a size of the machine learning model by performing post-training quantization of model weights and activations. In another example, the converting the machine learning model to the reduced machine learning model includes pruning the machine learning model to remove at least one synapse from the machine learning model.

It should be understood that the process depicted in FIG. 2 represents an illustration, and that, other processes may be added, or existing processes may be removed, modified, or rearranged without departing from the scope of the present disclosure.

Figure 3:
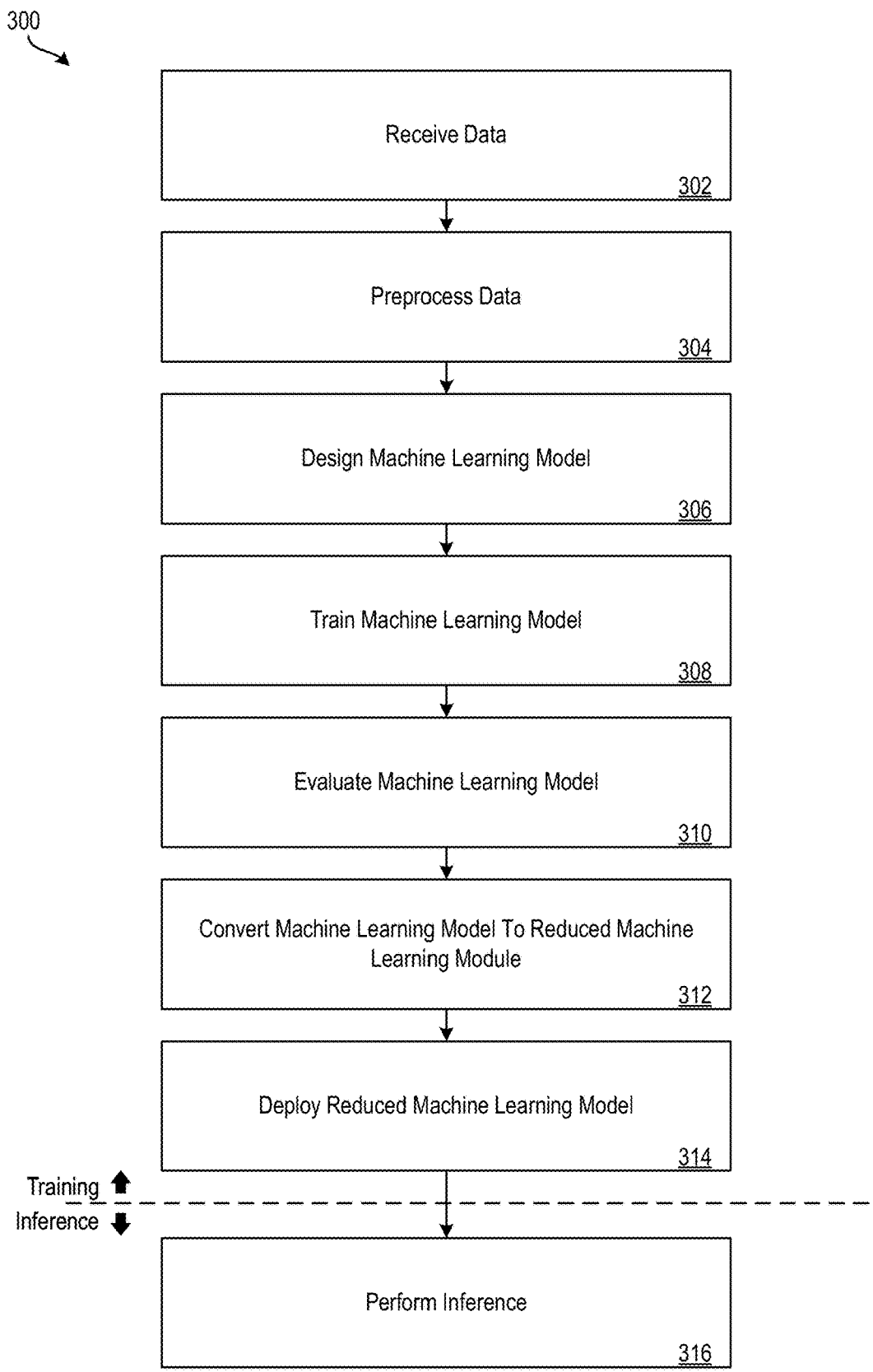
FIG. 3 depicts a flow diagram of a method for incipient compressor surge detection using artificial intelligence according to one or more embodiments described herein.

FIG. 3 depicts a flow diagram of a method 300 for training a machine learning model (e.g., the machine learning model 108) and using the machine learning model to detect incipient compressor surge within a cabin air compressor (e.g., the CAC 112) of a cabin air conditioning and temperature control system (e.g., the CACTCS 110) according to one or more embodiments described herein. The method 200 can be implemented by any suitable system or device, or combinations thereof, such as the processing system 100, the microcontroller 118, and/or the like.

At block 302, the processing system 100, using the ML model training engine 106, receives data for training the machine learning model 108. One way to make data set is by continuously collecting time domain vibration data for a sliding time period using the vibration sensor 116. If there is a surge alert by the built-in test, the vibration data in the time period before the surge is saved along with the rotor speed, which is measured by the speed sensor 114. Incipient surge occurs with sub-synchronous vibrations at a frequency of approximately 0.10× to 0.20× (10 to 20 percent of the rotor speed). The speed data is useful for confirming the occurrence of the incipient surge.

At block 304, the processing system 100, using the ML model training engine 106, preprocesses the data. Here, the time domain data is broken into small time slots and a fast Fourier transform is used to convert the time domain data into frequency domain data. By applying the FFT through a sliding window procedure, the intensity (e.g., in color) of each of frequencies over time can be analyzed to detect incipient surge events. Then, spectrograms are generated, and feature extraction can be performed on the spectrograms to identify incipient surge events, as will be described herein, using, for example, feature extraction.

At block 306, the processing system 100, using the ML model training engine 106, designs the machine learning model. According to one or more embodiments described herein, a convolutional neural network (CNN) is used to perform feature extraction on spectrograms. In other examples, other architectures, such as deep learning, can be used to achieve a balance between accuracy and memory requirements. A number of layers in the model depend on the storage available. For example, if there is no extra storage (e.g., for CNN), a minimum convolutional model with one conv2D layer and one dense layer can be used. This kind of model will provide a quick response time while accounting for memory constraints.

At block 308, the processing system 100, using the ML model training engine 106, trains the machine learning model. The machine learning model is trained and tested to achieve desired results. For example, model parameters such as accuracy, latency, and memory usage can be tuned to achieve the desired results. According to one or more embodiments described herein, training is performed on the processing system 100 and not the microcontroller 118 because the training uses highly accurate computation that the microcontroller 118 may not be able to provide. Further, the microcontroller 118 may not be able to store and/or process a dataset large enough to support training. However, in some examples, the microcontroller 118 can perform the training where the microcontroller 118 is sufficiently enabled to perform the training.

At block 310, the processing system 100, using the ML model training engine 106, evaluates the machine learning model. Evaluating the machine learning model can include considering one or more of the following properties: actual accuracy, actual latency, and/or actual memory usage. For example, these properties can be evaluated as compared to the desired properties (e.g., desired accuracy, desired latency, desired memory usage, etc. from block 306). Accuracy includes balancing between false positives (i.e., alerts when there is no incipient surge) and false negatives (i.e., no alert when incipient surge occurs). This operating point can be decided manually based on the requirements (e.g., the desired accuracy). For latency, it is desirable that the machine learning model be fast enough to keep up with the vibration inputs. This is also why it is desirable to reduce the model to keep the model small. For memory usage, it is useful to be resource aware. This can include being cognizant about memory allocations in the microcontroller 118 such as application code (receives data from the vibration sensor 116 and performs the preprocessing (block 304)), the inference engine deployed in the microcontroller 118, various variables and parameters that define the machine learning model 108 and other dynamic variables, a data buffer to store the data from the vibration sensor 114, and the like.

At block 312, the processing system 100, using the ML model training engine 106, converts the machine learning model to a reduced machine learning model (e.g., the ML model 108). This stage provides for the trained machine learning model to function correctly when deployed on the microcontroller 118. To convert a trained machine learning model to run on microcontrollers, the following steps are implemented: reduce the model size and modify it to use edge-based operations; quantize model weights and activations so they can be represented by 8-bit or fixed-point arithmetic (post-training quantization, although quantization aware training can also be implemented in some examples); prune the machine learning model by removing weights (synapses) that have relatively low impact on accuracy of the machine learning model, and convert the model to a file-type that the microcontroller 118 can receive.

At block 314, the processing system 100, using the ML model training engine 106, deploys the reduced machine learning model 108, such as to the microcontroller 118. According to one or more embodiments described herein, preprocessing code in a language executable by the microcontroller 118 is used to deploy the machine learning model 108 into the microcontroller 118.

At block 316, the microcontroller 118 performs inference. The microcontroller 118 continues to receive new (operational) vibration time domain data from the vibration sensor 116. This data is used to generate a spectrogram, which is applied to the machine learning model 108 by the microcontroller 118. If incipient surge is detected, alert is issued and/or an action is implemented as described herein.

Additional processes also may be included, and it should be understood that the process depicted in FIG. 2 represents an illustration, and that other processes may be added, or existing processes may be removed, modified, or rearranged without departing from the scope of the present disclosure.

Figure 4A:
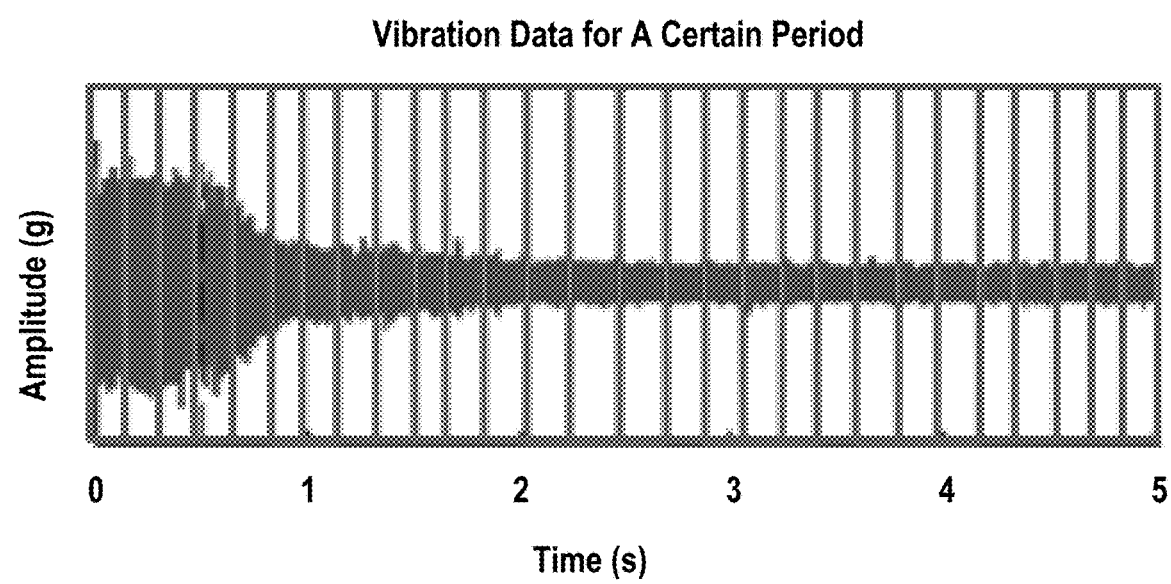
FIG. 4A depicts an example plot of vibration data according to one or more embodiments described herein.
Figure 4B:
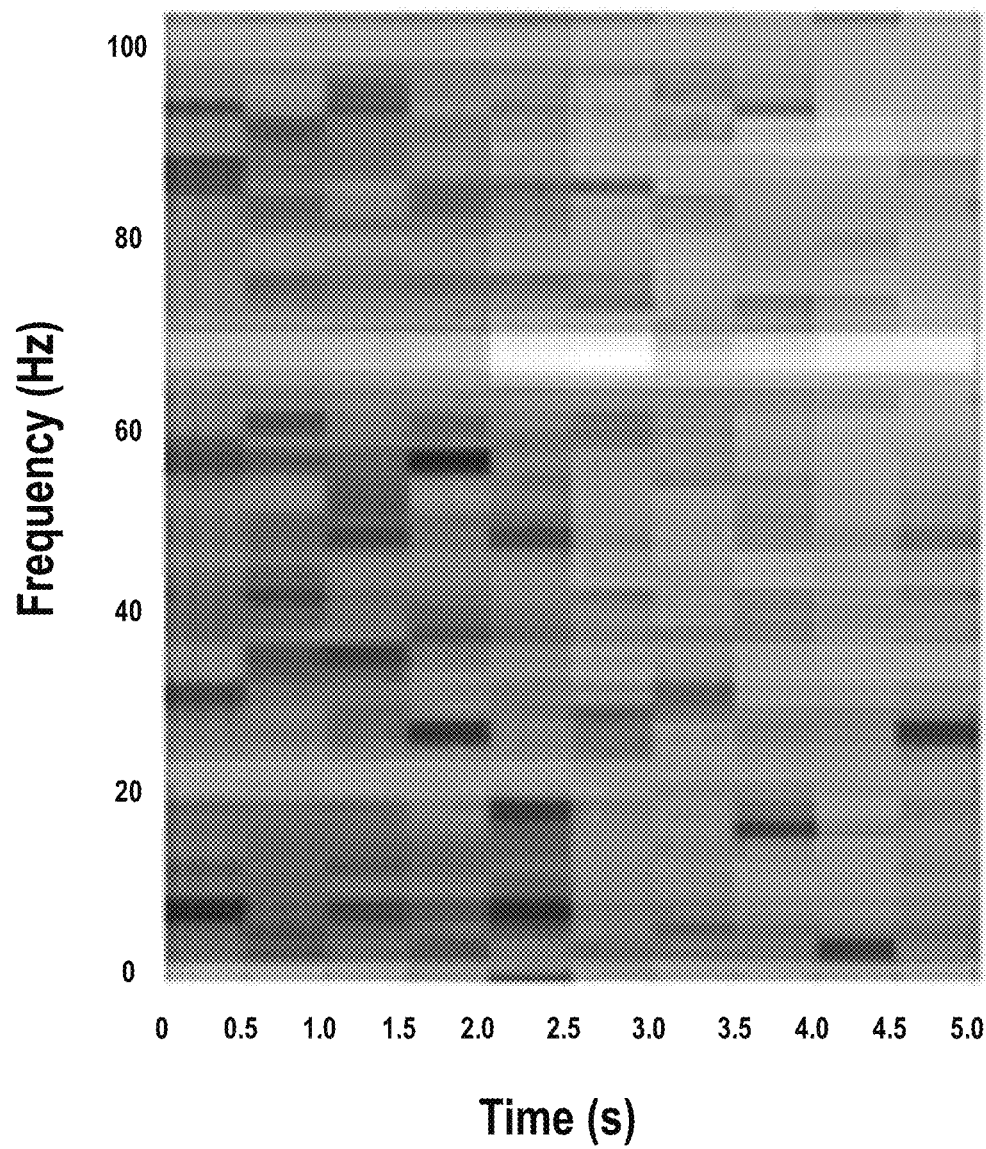
FIG. 4B depicts an example spectrogram according to one or more embodiments described herein.

FIG. 4A depicts an example plot 400 of vibration data according to one or more embodiments described herein. In this example, the plot 400 plots amplitude of vibration (as a g-force) against time (in seconds). During inference, for example, the vibration sensor 116 collects vibration data about the CAC 112, and the microcontroller 118 uses the vibration data generate a spectrogram. FIG. 4B depicts an example spectrogram according to one or more embodiments described herein. In this example, the plot 401 represents a spectrogram, which plots frequency (in Hz) against time (in seconds). The spectrogram in the plot 401 is created by taking the vibration data (e.g., from plot 400) and applying a fast Fourier transform to the vibration data. A sliding window procedure can be used. For example, the vibration data can be separated into overlapping windows (as shown). The results of the FFT are used to generate the spectrogram shown in the plot 401. The intensity (represented, for example, in color or otherwise) of each of the frequencies over time are shown in the spectrogram.

Figure 5:
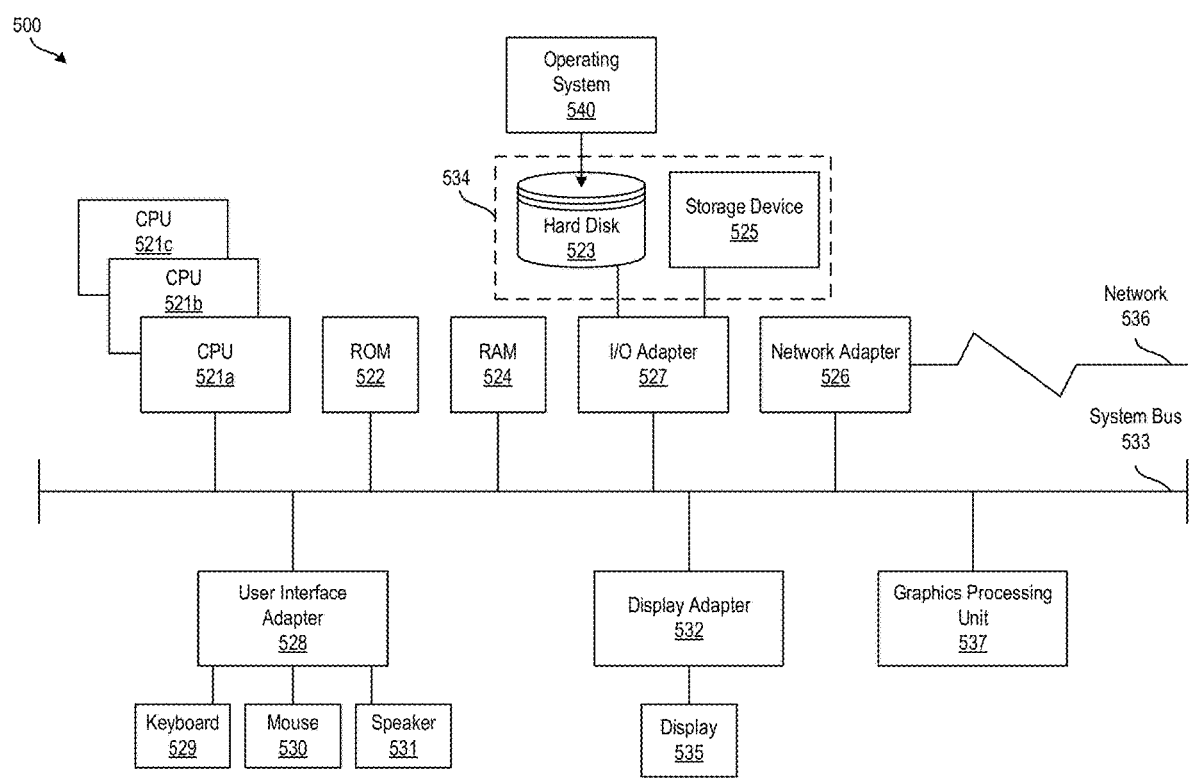
FIG. 5 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node that can be deployed in a cloud computing environment. In examples, processing system 500 has one or more central processing units ("processors" or "processing resources" or "processing devices") 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit.

In some aspects of the present disclosure, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in processing system 500.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A computer-implemented method for incipient compressor surge detection using artificial intelligence, the method comprising:
   receiving, at a processing system, training data indicative of incipient compressor surge for cabin air compressors;
   generating, at the processing system and using the training data, a training spectrogram;
   training, by the processing system, a machine learning model to detect incipient compressor surge events for the cabin air compressors using the training spectrogram;
   receiving, at a microcontroller associated with a cabin air compressor, operating data associated with the cabin air compressor;
   generating, at the microcontroller and using the operating data, an operating spectrogram;
   detecting, by the microcontroller associated with the cabin air compressor, an incipient compressor surge event by applying the machine learning model to the operating spectrogram; and
   implementing a corrective action to correct the incipient compressor surge event to increase a surge margin of the cabin air compressor by changing operation of one of: a variable diffuser, an anti-surge valve, an air cycle machine bypass valve (ABV).

2. The computer-implemented method of claim 1, wherein the training data comprises first vibration data and speed data.

3. The computer-implemented method of claim 2, wherein the operating data comprises second vibration data collected by a vibration sensor associated with the cabin air compressor.

4. The computer-implemented method of claim 1, wherein generating the training spectrogram comprises applying a fast Fourier transform to the training data.

5. The computer-implemented method of claim 1, wherein generating the operating spectrogram comprises applying a fast Fourier transform to the operating data.

6. The computer-implemented method of claim 1, further comprising, subsequent to training the machine learning model, evaluating the machine learning model based at least in part on an accuracy of the machine learning model, a latency of the machine learning model, and a memory usage of the machine learning model.

7. The computer-implemented method of claim 1, further comprising converting the machine learning model to a reduced machine learning model executable by the microcontroller, wherein the machine learning model is not executable by the microcontroller.

8. The computer-implemented method of claim 7, wherein the converting the machine learning model to the reduced machine learning model comprises reducing a size of the machine learning model by performing post-training quantization of model weights and activations.

9. The computer-implemented method of claim 7, wherein the converting the machine learning model to the reduced machine learning model comprises pruning the machine learning model to remove at least one synapse from the machine learning model.

10. The computer-implemented method of claim 1, wherein the machine learning model comprises a convolutional neural network.

11. A cabin air conditioning and temperature control system comprising:
  a cabin air compressor;
  a vibration sensor associated with the cabin air compressor;
  a microcontroller comprising:
    a memory storing a machine learning model and computer readable instructions, wherein the machine learning model is trained to detect incipient compressor surge events for the cabin air compressor, and
    a processing device for executing the computer readable instructions, the computer readable instructions controlling the processing device to perform operations comprising:
      receiving operating data from the vibration sensor;
      generating, using the operating data, an operating spectrogram;
      detecting an incipient compressor surge event by applying the machine learning model to the operating spectrogram; and
      implementing a corrective action to correct the incipient compressor surge event to increase a surge margin of the cabin air compressor by changing operation of one of: a variable diffuser, an anti-surge valve, an air cycle machine bypass valve (ABV).

12. The cabin air conditioning and temperature control system of claim 11, wherein the machine learning model is trained using vibration data and speed data.

13. The cabin air conditioning and temperature control system of claim 11, wherein the machine learning model is trained by a processing system remote from the cabin air conditioning and temperature control system.

14. A computer program product comprising a computer readable storage medium having program instructions embodied therewith, the program instructions executable by a processor to cause the processor to perform operations comprising:
  collecting data from sensors associated with cabin air compressors;
  preprocessing the data by separating the data into time slots and applying a fast Fourier transform to the data within each of the time slots to generate training spectrograms;
  designing a machine learning model;
  training the machine learning model using the training spectrograms;
  evaluating the machine learning model;
  converting the machine learning model to a reduced machine learning model; and
  deploying the reduced machine learning model to a microcontroller associated with a cabin air compressor; and
  controlling the cabin air compressor by changing operation of one of: a variable diffuser, an anti-surge valve, an air cycle machine bypass valve (ABV) based on the reduced machine learning model.

15. The computer program product of claim 14, wherein designing the machine learning model is based on a desired accuracy of the machine learning model, a desired latency of the machine learning model, and a desired a memory usage of the machine learning model.

16. The computer program product of claim 15, wherein evaluating the machine learning model is performed by comparing an actual accuracy of the machine learning model, an actual latency of the machine learning model, and an actual memory usage of the machine learning model to the respective desired accuracy of the machine learning model, the desired latency of the machine learning model, and the desired a memory usage of the machine learning model.

17. The computer program product of claim 15, wherein training the machine learning model comprises tuning model parameters to achieve the desired accuracy of the machine learning model.

18. The computer program product of claim 14, wherein the machine learning model is a convolutional neural network trained to perform feature extraction on operating spectrograms.

19. The computer program product of claim 14, wherein collecting data from the sensors associated with the cabin air compressors comprises:
  performing a built-in test of the cabin air compressor;
  detecting a surge by the built-in test; and
  responsive to detecting the surge, saving the data a predetermined time interval before the detected surge.

20. The computer program product of claim 14, wherein the data comprises vibration data and speed data.

* * * * *